United States Patent
Dinwiddie et al.

[19]

[11] Patent Number: 5,959,687
[45] Date of Patent: *Sep. 28, 1999

[54] SYSTEM PROVIDING FREEZE OF CLOSED CAPTIONING DATA

[75] Inventors: Aaron Hal Dinwiddie, Fishers; Robert Lawrence O'Brien, Indianapolis, both of Ind.

[73] Assignee: Thomson Consumer Electronics, Inc., Indianapolis, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 08/948,388

[22] Filed: Oct. 10, 1997

Related U.S. Application Data

[63] Continuation of application No. 08/557,798, Nov. 13, 1995, abandoned.

[51] Int. Cl.$^6$ .............................. H04N 7/00; H04N 11/00
[52] U.S. Cl. .......................... 348/564; 348/460; 348/461; 348/563; 348/468
[58] Field of Search ..................................... 348/565, 567, 348/468, 462, 465, 564, 568, 559, 556, 563, 473, 476, 478, 479, 584, 589, 569, 460, 461

[56] References Cited

U.S. PATENT DOCUMENTS

| | | |
|---|---|---|
| 4,172,264 | 10/1979 | Taylor et al. ............................ 358/185 |
| 4,680,629 | 7/1987 | Fukushima et al. ..................... 348/563 |
| 4,777,531 | 10/1988 | Hakamada ............................... 348/565 |
| 4,971,448 | 11/1990 | Vanzon .................................... 348/567 |
| 5,109,279 | 4/1992 | Ando ....................................... 358/147 |
| 5,177,598 | 1/1993 | Jeong ..................................... 358/21 R |
| 5,543,851 | 8/1996 | Chang ..................................... 348/468 |
| 5,557,338 | 9/1996 | Maze et al. ............................. 348/569 |
| 5,572,260 | 11/1996 | Onishi et al. ........................... 348/460 |

OTHER PUBLICATIONS

© 1992 McGraw–Hill, Inc. Byte, Jul. 1992 "Caption Decoder Does More Than Decode".
© 1995 Ziff–Davis Publishing Co., PC Magazine Jun. 27, 1995, Hardware, PC Solutions; Question & Answer Column.
© 1991 Information Access Co.© Coastal Associates Publishing L.P. 1991 Macweek by Ric Ford "System supports multimedia apps".
Michael Slater, Micro Processor–Based Design, 1989 p. 185, 186 Fig. 4.12.

*Primary Examiner*—John K. Peng
*Assistant Examiner*—Linus H. Lo
*Attorney, Agent, or Firm*—Joseph S. Tripoli; Peter M. Emanuel; Robert D. Shedd

[57] ABSTRACT

A video signal processing system produces an output signal suitable for producing a closed caption display and is responsive to a "freeze" command from a user for modifying generation of the output signal such that the content of the closed caption region of the display does not change. The system provides for user selection of various freeze modes including one in which just the caption region of a display is frozen, another in which just the video region of the display is frozen, and another in which both the caption and video regions of the display are frozen.

8 Claims, 5 Drawing Sheets

SYSTEM PROVIDING FREEZE OF CLOSED CAPTIONING DATA

This is a continuation of application Ser. No. 08/557,798, filed Nov. 13, 1995, now abandoned.

FIELD OF THE INVENTION

The present invention involves systems for processing auxiliary information, such as closed caption data, that is included in a television signal.

BACKGROUND

In addition to the video and audio program portions of a television program, television signals include auxiliary information. An analog television signal such as an NTSC standard television signal includes auxiliary data during horizontal line intervals within the vertical blanking interval. An example is closed caption data which is included in line 21 of field 1. Digital television signals typically include packets, or groups, of data words. Each packet represents a particular type of information such as video, audio or auxiliary information. An example of a digital television system that processes a packetized digital television signal is the DSS™ (Digital Satellite System) manufactured by Thomson Consumer Electronics, Inc., Indianapolis, Ind.

Whether the system is analog or digital, a video receiver processes both video information and auxiliary information in an input signal to produce an output signal that is suitable for coupling to a display device such as a kinescope. Enabling an auxiliary information display feature, such as closed captioning, causes a television receiver to produce an output video signal that includes one signal component representing video information and another signal component representing the auxiliary information. A displayed image produced in response to the output video signal includes a main image region representing the video information component of the output signal and a smaller image region that is inset into the main region of the display. In the case of closed captioning, a caption displayed in the small region provides a visible representation of audio information, such as speech, that is included in the audio program portion of a television program.

In addition to auxiliary information processing, television systems may also include a picture-in-picture (PIP) feature that, when enabled, displays a small picture (pix) representing a first video signal simultaneously with a large, or main, pix representing a second video signal. The small pix is inset into a portion of the main pix. The small pix typically changes as video information in the first video signal changes, but certain systems include a freeze feature that prevents the image in the small pix from changing. Non-video portions of the television signal such as the audio program and closed caption information are processed separately from the video and are not affected by activation of a small-pix freeze feature.

SUMMARY OF THE INVENTION

One aspect of the present invention involves recognizing that it may be desirable to prevent displayed auxiliary information, such as a closed caption, from being modified in response to auxiliary information in the input television signal. For example, a caption may include a phone number and a user may wish to prevent the caption from changing while copying the phone number.

Another aspect of the invention involves providing a system for solving the described problem. The system responds to an input signal including video information, audio information, and data representing a portion of the audio information for generating an output signal suitable for coupling to a display device to produce an image having first and second regions. The second region is produced in response to the data included in the input signal for providing a visible representation of the portion of the audio information represented by the data included in the input signal. The system is responsive to a command code provided by a user for preventing updating of the visible representation in response to the data.

Another aspect of the invention involves a system that provides for selecting among a plurality of modes of operation of the system. Each mode of operation involves processing an input signal having a plurality of signal components to provide an output signal suitable for producing an image having a plurality of regions. The image in each region is updated in response to a respective one of the plurality of signal components. Each mode of operation prevents updating of at least one of the regions.

BRIEF DESCRIPTION OF THE DRAWING

The invention may be better understood by referring to the enclosed drawing in which.

DETAILED DESCRIPTION

Figure 1:
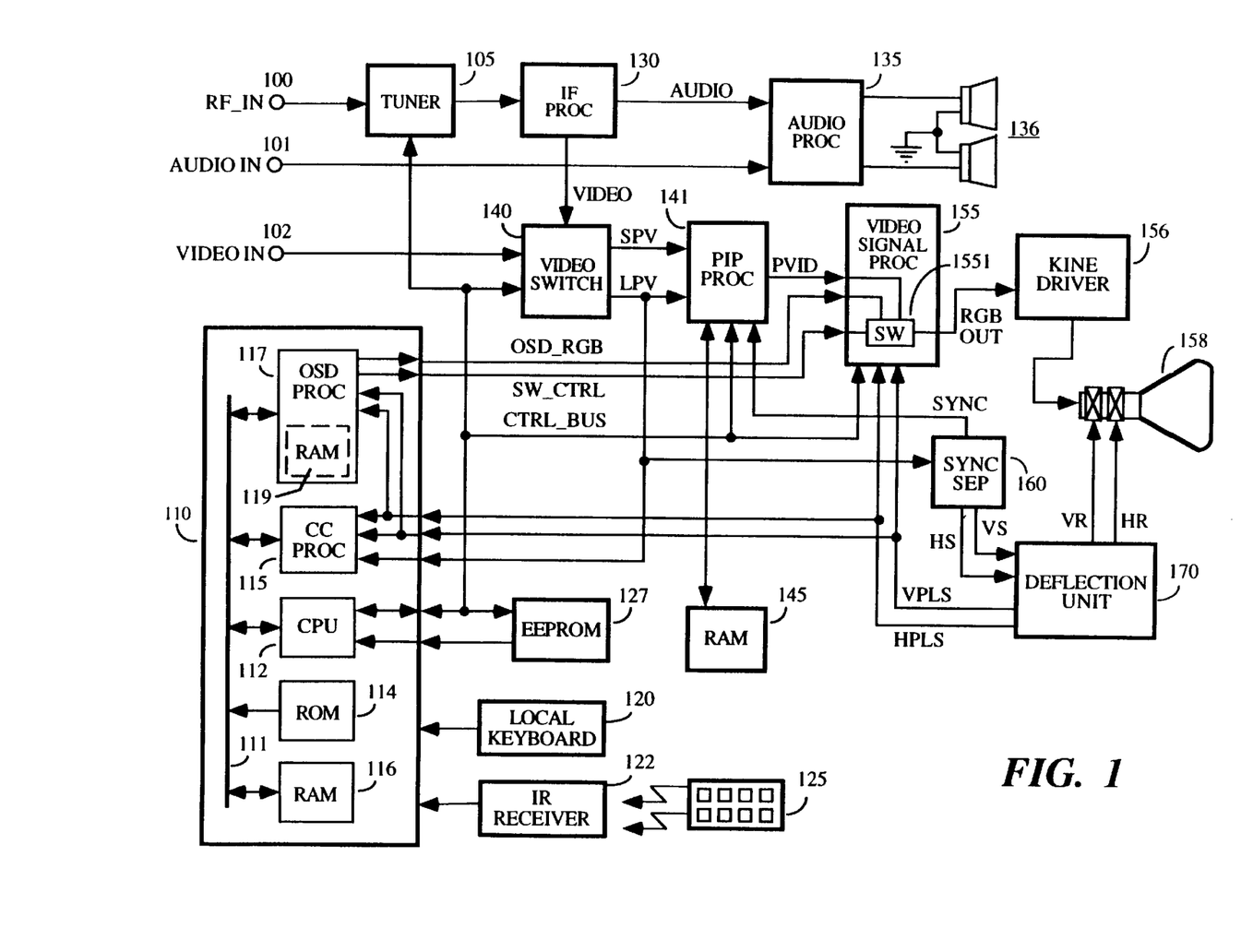
FIG. 1 shows a block diagram of a television system embodying principles of the invention.

An exemplary television receiver shown in FIG. 1 includes an input terminal 100 which receives radio frequency (RF) television signals, e.g., from an antenna or cable, and applies them to a tuner assembly 105. Tuner assembly 105 selects and amplifies a particular RF signal in response to control signals from controller 110. As used herein, the terms "controller", "control processor", "microprocessor" (or μP), and "microcomputer" (or μC) are equivalent and refer to devices, either in integrated circuit (IC) form or not, that provide a control function. In FIG. 1, controller 110 includes central processing unit (CPU) 112, ROM 114 and RAM 116 interconnected via bus 111 and operating in a manner typical of microcomputers such as the ST9 integrated circuit (IC) manufactured by SGS Thomson, Inc. CPU 112 in μC 110 generates control signals for the system in response to software instructions stored in ROM 114 and EEPROM 127 and in response to user-provided command codes that are generated by activation of keys of "local" keyboard 120, e.g., mounted on the television receiver front panel, and of infra-red (IR) remote control 125. Controller 110 receives command codes from IR remote 125 via IR receiver 122. Control signals generated by controller 110 are communicated to other devices in the system, such as tuner 105, via a control bus represented by the path labeled CTRL_BUS in FIG. 1. A typical implementation of the control bus shown in FIG. 1 is a two-wire serial bus based on the Inter-Integrated Circuit (IIC or I²C) bus protocol supported by Philips.

When a user selects a particular television channel by activating either keyboard 120 or remote control 122, controller 110 produces a control signal on bus CTRL_BUS that causes tuner 105 to tune the RF signal of the selected channel. Tuner 105 outputs an intermediate frequency (IF) signal corresponding to the tuned channel. IF processor 130 includes circuits such as a video IF (VIF) amplifying stage, an AFT circuit, a video detector, and a sound IF (SIF) amplifying stage for processing the IF signal to produce baseband composite video signal VIDEO and sound carrier signal AUDIO. Audio signal processor 135 includes an audio detector and a stereo decoder that process signal AUDIO to produce a first baseband audio signal suitable for driving speaker unit 136. Signal AUDIO IN represents a second baseband audio signal supplied by an external source, e.g., a video cassette recorder (VCR), that is coupled to audio processor 135 through AUDIO IN terminal 101. Also included in audio processor 135 is a switch (not shown in FIG. 1) that couples one of the first and second baseband audio signals to speaker unit 136 under control of controller 110.

The exemplary television receiver shown in FIG. 1 includes picture-in-picture (pix in pix or PIP) processing capability for displaying a small image (small pix) representing one video signal in a portion of a larger or main image (large pix) representing a second video signal. More specifically, the system shown in FIG. 1 includes PIP processing features comprising video switch 140, PIP processor 141 and RAM 145. Baseband composite video signal VIDEO from IF processor 130 is applied to one input of video switch 140. A second baseband composite video signal VIDEO IN from an external source such as a VCR is coupled to a second input of switch 140 via terminal 102. In response to control signals received from controller 110 via bus CTRL_BUS, switch 140 couples one of baseband signals VIDEO and VIDEO IN to the path labeled LPV (large pix video) and the other baseband signal to the path labeled SPV (small pix video).

When the PIP feature is activated, e.g., a user presses a "PIP" key on remote control 125, PIP processor 141 combines signals LPV and SPV such that signal PVID produced by processor 141 represents signal SPV during intervals when the small pix is to be displayed and represents signal LPV at other times, i.e., when the large pix is to be displayed. Signal LPV is coupled to signal PVID continuously when PIP processing is disabled. PIP processor 141 includes an analog-to-digital converter (ADC) and filtering that convert signal SPV into digital data representing the small pix. The data is stored in RAM 145. When the small picture is to be displayed, the stored data is read from RAM 145, converted to an analog small picture signal via a digital-to-analog converter (DAC) included in PIP processor 141 and inserted in signal PVID. Timing circuits in PIP processor 141 synchronize insertion of the small picture signal into signal PVID with the large picture signal so as to include the small picture in the proper portion of the large picture display. The timing circuits operate in response to a synchronizing signal SYNC from sync separator 160 that indicates when horizontal display intervals occur in signal LPV.

Signal PVID from PIP processor 141 is processed by video signal processor 155 to produce red, green and blue (R, G and B) output signals RGB that are suitable for coupling to an image display device. Processing in processor 155 includes automatic chroma and luma control features and user-controlled features such as contrast and brightness control. The RGB signals produced by processor 155 are amplified to appropriate high voltage levels by kinescope driver amplifiers 156 before being coupled to kinescope 158 to display the desired image. The display on kinescope 158 is controlled by vertical and horizontal deflection signals VR and HR, respectively, that are coupled to deflection coils of kinescope 158. Deflection unit 170 produces signals HR and VR in response to horizontal and vertical sync signals HS and VS, respectively, that are separated from the synchronization component of the composite large picture video signal LPV by sync separator 160. Those parts of the system in FIG. 1 that have been described thus far are known, for example, from the CTC-176 color television chassis manufactured by Thomson Consumer Electronics, Indianapolis, Ind.

Figure 2:
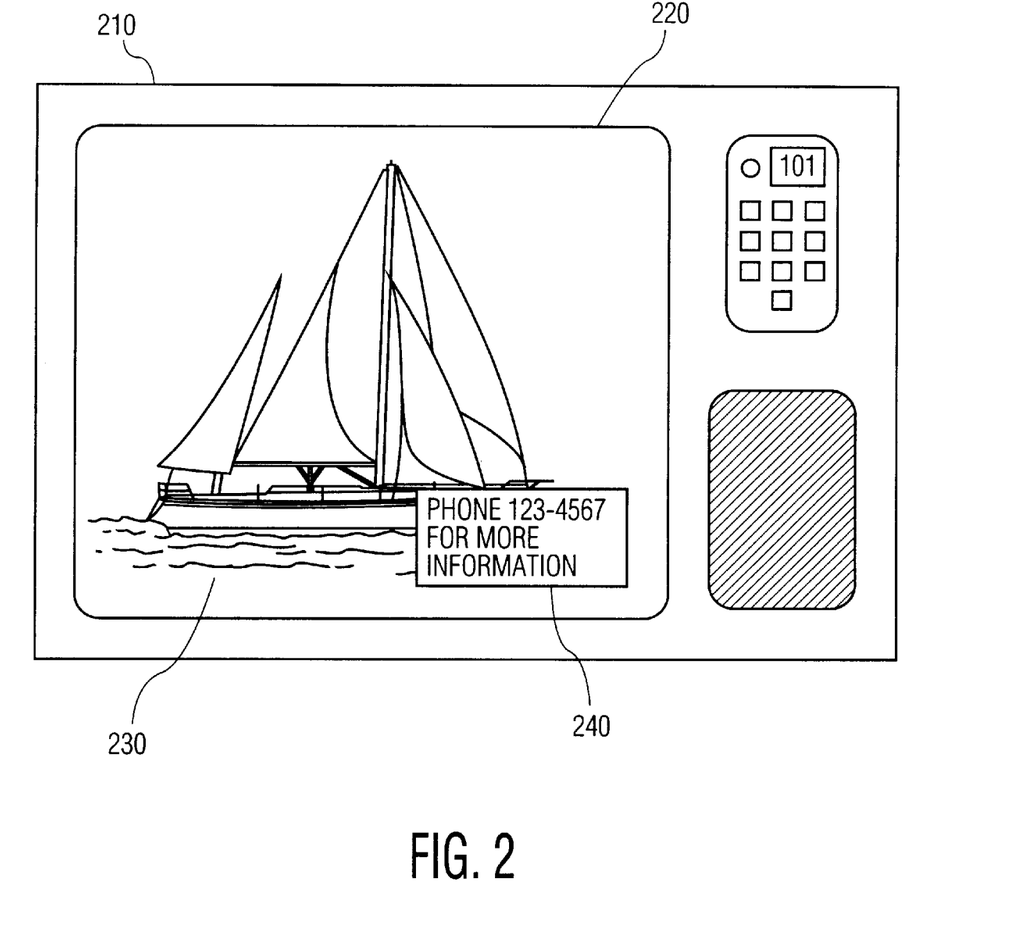
FIG. 2 illustrates a television display exhibiting an aspect of the invention.

The system shown in FIG. 1 also includes closed caption display capability in accordance with principles of the invention. More specifically, in addition to producing a closed caption (CC) display, the system provides for "freezing" the CC display, i.e. preventing the display from changing, in response to a command from a user. FIG. 2 illustrates a situation in which freezing a closed caption display might be desirable. In FIG. 2, television receiver 210 includes a display device 220 that produces a closed caption display 240 in one region of the image and a video display 230 in another region of the image. Information included in closed caption display 220 comprises a telephone number that a user might wish to save. However, a closed caption display changes as the audio portion of a television program changes and the phone number may disappear before a user can record the number. By activating a caption freeze feature, e.g., by pressing a key on remote control 125, a user can maintain the caption display unchanged until the phone number has been recorded. As explained in detail below, the embodiment shown in FIG. 1 provides the described closed caption freeze function via features of $\mu$C 110 including closed caption processor 115, on-screen display (OSD) processor 117 and CPU 112. The following explanation also refers to FIG. 3 which shows portions of $\mu$C 110 in more detail. Reference designators that are the same in both FIGS. 1 and 3 indicate the same or similar features.

Closed caption data needed to produce a closed caption display is extracted from the large picture video signal LPV in FIG. 1 by closed caption processor 115. CC processor 115 extracts two bytes of closed caption data during the latter half of each occurrence of line 21 of field 1, i.e., the closed caption data interval. Each byte of data represents either an ASCII character that is to be included in the display or a control code defining attributes of the closed caption display such as the location in the image where the caption is to be placed.

Figure 3:
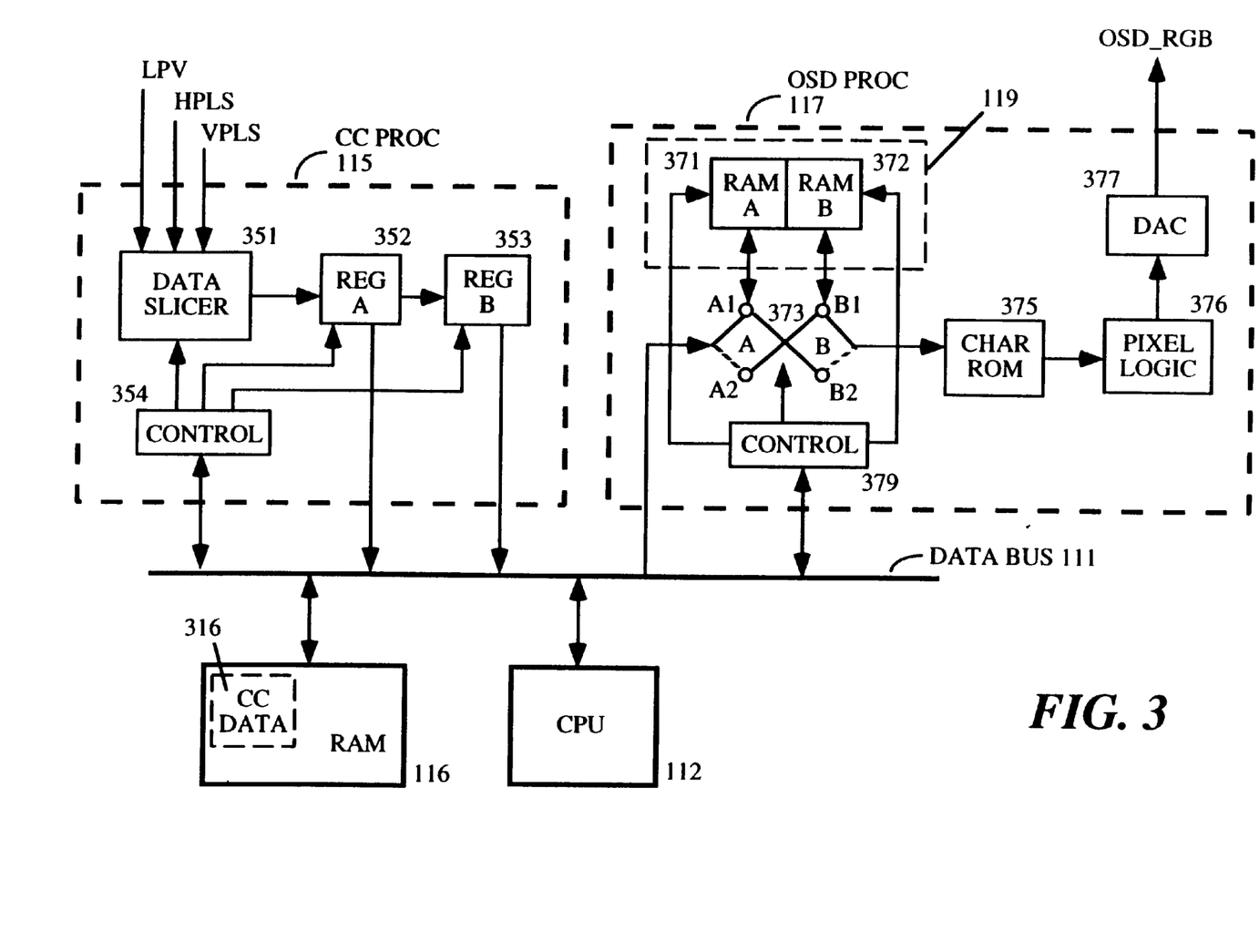
FIG. 3 shows, in block diagram form, a more detailed representation of a portion of the television system shown in FIG. 1.

As can be seen in FIG. 3, CC processor 115 includes data slicer 351, two eight-bit registers 352 and 353 and control unit 354. A data slicer design suitable for implementing data slicer 351 is described in detail in International Patent Application No. PCT/US 93/07163 (published Mar. 31, 1994 under International Publication No. WO 94/07334) filed Jul. 29, 1993 in the name of Juri Tults and designating the United States. The indicated International Patent Application is commonly assigned with the present application and is hereby incorporated by reference. When closed captioning is enabled, CPU 112 writes control data to a register in control unit 354 that enables data slicer 351. Timing circuitry in data slicer 351 responds to timing signals HPLS, VPLS and the synchronizing signal component of signal LPV to determine when the closed caption interval occurs. During the closed caption interval, data slicer 351 produces a series of 16 bits of closed caption data from signal LPV.

Each bit is shifted serially into registers 352 and 353 as it is produced by data slicer 351. At the end of the closed caption interval, registers 352 and 353 each contain one byte of closed caption data. When all 16 bits of CC data have been loaded into registers 352 and 353, an interrupt flag is set in control unit 354 causing CPU 112 to read the bytes of data from the registers via bus 111. Bytes representing characters that are to be included in the CC display are stored in a portion of RAM 116 that is designated CC DATA 316 in FIG. 3. Bytes representing CC control information are processed by CPU 112 to provide information needed to properly display the CC data.

After all characters needed to form a complete row of the closed caption display have been received and stored in RAM 116, CPU 112 transfers the data from RAM 116 to RAM 119 in OSD processor 117 via bus 111. As can be seen in FIG. 3, RAM 119 is divided into two sections, namely RAM 371 and RAM 372. Each section will store one complete row of closed caption character data. Data that is transferred to RAM 119 by CPU 112 is written into one section of RAM 119, e.g., RAM 371, that serves as a buffer while data is being read from the other section of RAM 119, e.g., RAM 372, to display a row of captioning. By the time that all data in the display section of RAM 119 has been read and displayed, the buffer section has been filled with new data. The buffer and display functions of the sections of RAM 119 are swapped and the next row of captioning is displayed.

For example, FIG. 3 shows data from bus 111 being written into RAM 371 via node A1 on the "A" side of double-pole-double-throw switch 373 and data being read from RAM 372 via node B1 on the "B" side of switch 373. Thus, RAM 371 functions as buffer memory while RAM 372 is display memory. When display of a row of captioning is complete, the functions of RAM 371 and RAM 372 are swapped by changing RAM 371 to read mode and RAM 372 to write mode. The swapping of RAM functions is accomplished by switching switch 373 to couple data from bus 111 to buffer RAM 372 via node A2 of switch 373 while data is read from RAM 371 for display via node B2. Switch 373 is controlled by control unit 379 in OSD processor 117.

CC character data that is read from RAM 371 or RAM 372 for display is coupled first to ROM 375 which contains a lookup table providing the display pixel values needed to produce the particular character being read from RAM. The pixel values are processed by pixel logic unit 376 to produce digital representations of red, green and blue (R, G and B) color signals that will produce the required pixel values. The digital R, G and B signals are converted to analog R, G and B signals through digital to analog converters (DAC) that are included in OSD processor 117. The analog R, G and B signals are output from μC 110 and coupled to video signal processor 141 via the path labeled OSD_RGB in FIGS. 1 and 3. In addition to the analog R, G and B signals, OSD processor 117 generates a control signal SW_CTRL indicating intervals during which the OSD data is to be displayed. A fast switch 1551 in video signal processor 155 responds to signal SW_CTRL for coupling the OSD R, G, and B output signals to video processing circuits in processor 155 during OSD display intervals. The video processing circuits produce signals RGBOUT that are coupled to display device 158 for producing the desired on-screen display. At other times, e.g., during main picture display intervals, switch 1551 decouples signals OSD_RGB from the RGBOUT path and couples the R, G and B signals on path PVID to signals RGBOUT via the video processing circuits. An image representing the video information in signal PVID is produced as a result.

In accordance with principles of the invention, a closed caption display produced by the system in FIGS. 1 and 3 can be frozen, i.e., the CC data display continues and does not change in response to new CC data in signal LPV. Freezing of a CC display is initiated by a user selecting a "freeze captioning" mode of operation by, for example, pressing a particular button on remote control 125. Microcomputer 110 receives the freeze captioning command code and CPU 112 responds by executing a "freeze captioning" software routine that continues producing a CC display and sets a bit in an interrupt control register within CPU 112 for masking the "data-available" interrupt signal from CC processor 115. As a result, CPU 112 ignores interrupts from CC processor 115 that indicate new closed caption data is available and neither retrieves new closed caption data nor transfers new CC characters to RAMs 116 and 119. Swapping of RAMs 371 and 372 by the action of switch 373 continues during freeze mode, but because new data is not written into either RAM, the CC display does not change during freeze caption mode, i.e., the display is frozen.

An alternative approach to freezing the CC display involves preventing data in area 316 of RAM 116 (see FIG. 3) from changing during the freeze caption mode of operation. More specifically, user activation of the freeze captioning mode of operation prevents CPU 112 from transferring new closed caption data bytes from CC processor 115 to section 316 of RAM 116. Thus, the data in section 316 does not change. CPU 112 continues to transfer data from RAM 116 to RAM 119 in OSD processor 117 during the freeze mode to provide the data for each row of CC characters in the display. However, because the data in RAM 316 does not change, the data being written into RAMs 371 and 372 does not change, thereby preventing changes in the CC display.

In addition to producing closed caption display signals, OSD processor 117 generates signals for displaying graphics such as on-screen menus. Because the capacity of memory 149 in OSD processor 117 is limited, a television receiver such as that shown in FIG. 1 does not display both graphics and closed captioning simultaneously. For example, if a closed caption display is being generated and a user activates a feature that requires displaying a menu, the caption display will be disabled while RAM 119 is used to generate the menu display.

If caption freeze mode is active when a menu display is activated, two options exist for handling the data corresponding to the frozen caption image. First, if the frozen caption is generated by preventing the data in memory 119 from changing as described above, the contents of memory 119 can be discarded by replacing the CC data with menu display data when the menu is activated. When the menu display mode ends, the caption re-appears if captioning remains enabled (a user could disable captioning or caption freeze while the menu is displayed by selecting an appropriate menu entry). Because data for the previous caption was discarded, the caption display contains new closed caption data that changes in response to data in the input signal if freeze-caption mode is disabled or is frozen if freeze mode is enabled. Second, the closed caption data can be transferred from memory 119 to RAM 116 when menu display is activated, stored temporarily in RAM 116 while the menu is displayed and restored to RAM 119 when the menu display ends. An this way, the frozen caption that existed before the menu display began can be restored when menu display ends. If captioning is disabled during the menu display interval, no caption is produced when menu display ends. If caption freeze is disabled during the menu interval but captioning remains enabled, the caption display re-appears and changes in response to the input signal when the menu interval ends.

In addition to freezing closed captioning, a television receiver constructed in accordance with another aspect of the invention provides for selecting one of a plurality of image-freeze modes of operation. For example, during a first mode of operation, a closed caption display is frozen as described above while the main image, e.g., a television program display continues to be updated in response to the input signal. A second mode of operation involves freezing the main image while the closed caption display continues to change. An exemplary approach to freezing the main image is described below. The main image and the caption are frozen simultaneously during a third mode of operation. Each freeze mode of operation involves preventing one or more regions of a multi-region display from being updated in response to one or more respective signal components of an input signal.

Figure 4:
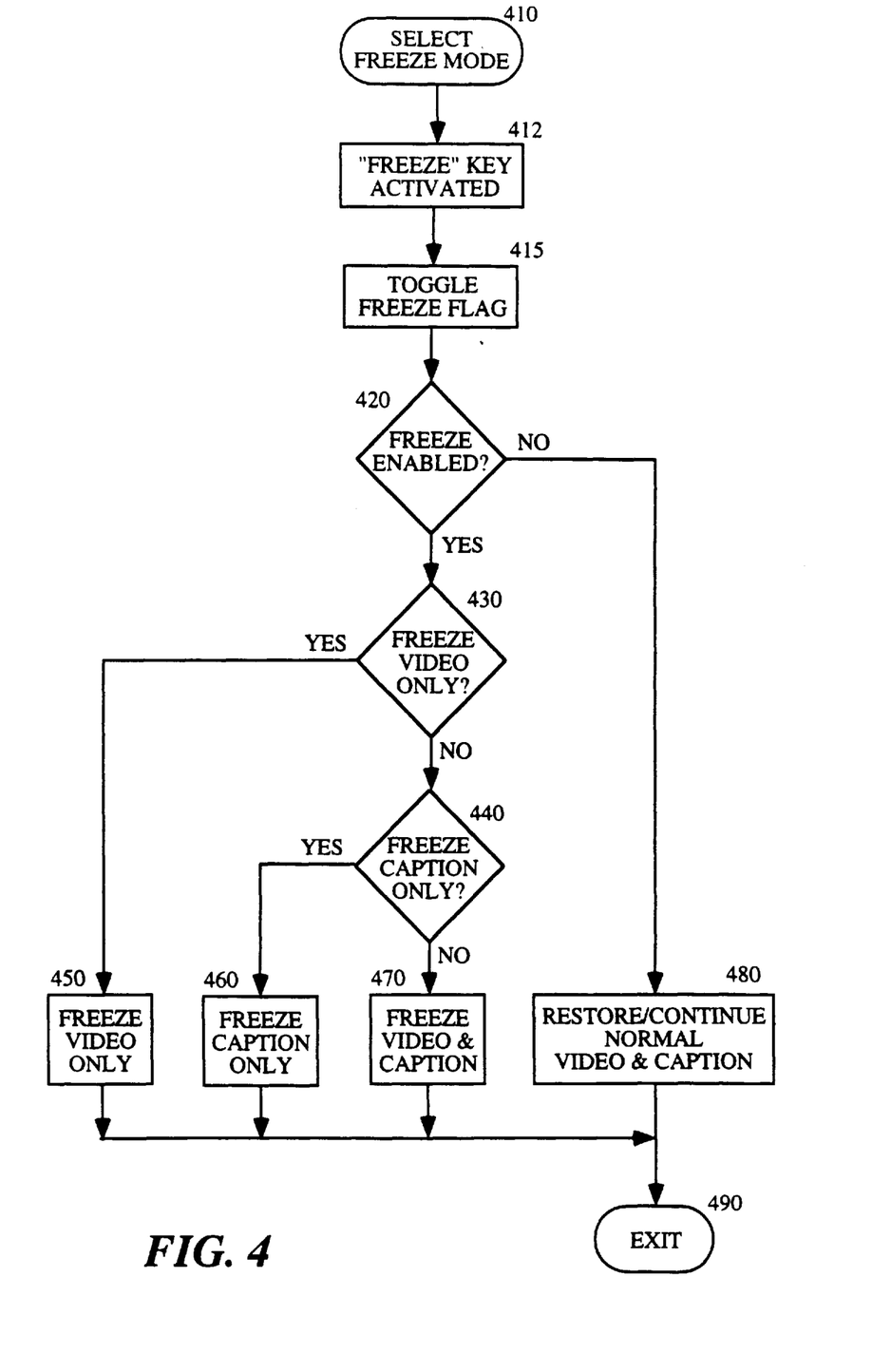
FIG. 4 shows a flowchart illustrating operating modes of the system shown in FIG. 1.

FIG. 4 shows a flowchart illustrating an approach to selecting the described options. The control features shown in FIG. 4 can be implemented in software that is executed by controller 110 in FIG. 1 or by a control processor of a digital television receiver. The routine in FIG. 4 begins at step 410 where a user selects a freeze mode of operation, i.e., freeze captioning only, freeze video only, or freeze video and captioning, for the system. Mode selection can be accomplished by providing the various freeze modes as selectable options on a menu that is displayed on display device 158 in FIG. 1. Display of the menu and selection of a desired freeze mode option on the menu can both be accomplished by activating an appropriate key, or keys, on remote control 125 in FIG. 1. Selection of a freeze mode produces a corresponding command code that is processed by control processor 110 to establish values of freeze mode bits that indicate the selected mode.

A user activates the selected freeze mode by providing a particular command code, e.g., by pressing a freeze key on remote control 125 in FIG. 1. The freeze-activation command code is detected by controller 110 at step 412 in the procedure in FIG. 4. The system responds to the command code by toggling the freeze status at step 415 meaning that video and/or caption freeze ceases if it had been active or begins if inactive. Toggling the freeze status can be accomplished, for example, by the control processor changing the state of a freeze status bit in response to the freeze command code.

At step 420, the system determines whether or not freeze mode is enabled by checking the freeze status, e.g., testing a freeze status flag bit. If freeze is disabled ("NO" at step 420), normal video and caption display is restored at step 480 and the routine is exited at step 490. If freeze is enabled ("YES" at step 420), the controller determines the freeze mode selected at step 410 by testing the freeze mode bit values at steps 430 and 440. Step 430 detects if only video, i.e., the main image, is to be frozen and, if so, activates video-only freeze processing at step 450 followed by the routine being exited at step 490. A negative result at step 430 indicates that either only captioning should be frozen or that both captioning and video should be frozen. Thus, a negative result at step 430 leads to a determination at step 440 as to whether only captioning is to be frozen. If so, caption-only freeze is activated at step 460 followed by termination of the routine at step 490. If not, step 440 is followed by step 470 where freeze of both video and captioning is initiated before exiting the routine at step 490.

Modes of operation that involve freezing video in the main region of the image can be implemented by including in the system a memory having capacity sufficient to store digital data representing a complete full-screen video image. For example, the capacity of RAM 145 in FIG. 1 could be such that all data needed to produce a main image is stored in one area of RAM 145. Other areas of RAM 145 store data for producing a closed caption display and for producing a small pix when PIP is active. When a user activates video freeze by providing the appropriate command code, controller 110 sends a command to processor 141 that prevents the contents of the memory area that stores the main image data from changing in response to video information in the input signal. Instead, the stored data is accessed and used repeatedly to produce an image that does not change rather than constantly updating the stored data and, thereby, the image as new information is received. As described above, caption freeze can be implemented by preventing changes in an area of memory that stores data representing the caption display. Thus, the described video and/or caption freeze modes of operation can be provided by preventing the data in one or more areas of memory from changing in response to the input signal.

Figure 5:
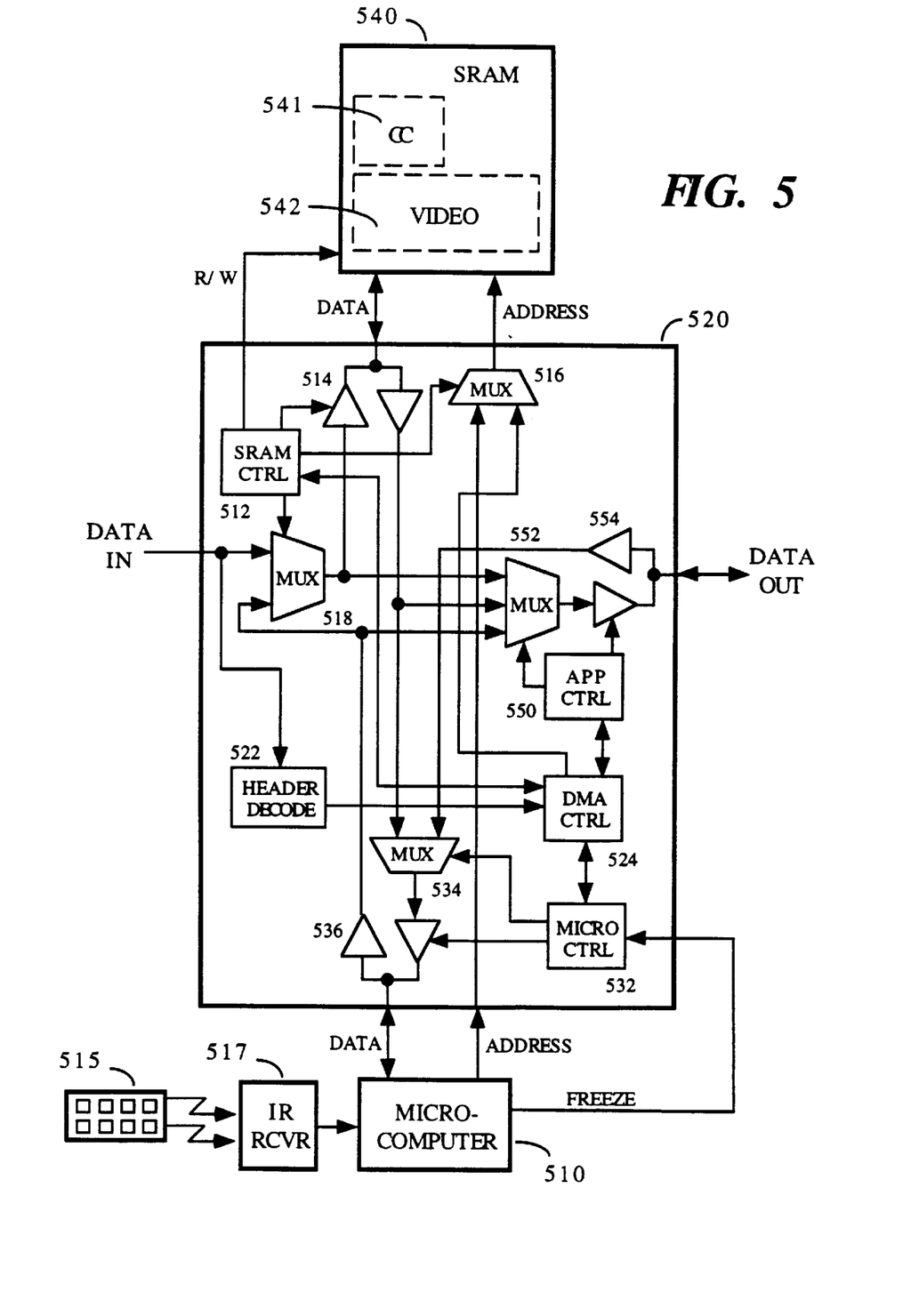
FIG. 5 shows, in block diagram form, an embodiment of another system incorporating principles of the invention.

Although the preceding discussion has been in regard to systems processing analog television signals, the invention is also applicable to digital television signal processing systems. The system illustrated in FIG. 5 represents a portion of a digital signal processing system such as the DSS™ (Digital Satellite System) system mentioned above that can provide the freeze caption and/or freeze video feature described. In FIG. 5, microcomputer 510 controls system operation in response to command codes provided by user, e.g., via remote control 515 and IR receiver 517 in manner similar to that described above in regard to corresponding features of FIG. 1. Digital input signal "DATA IN" includes data representing video and audio information and data such as closed caption data that represents at least a portion of the audio information. Signal DATA IN is provided by a signal source such as a tuner or VCR (not shown in FIG. 5) and is processed by a processor 520 that provides a "transport" function comprising routing of data. Processor 520, which may be an integrated circuit, stores (writes) data from signal DATA IN into static RAM (SRAM) 540, accesses (reads) the stored data, and includes the data in output signal DATA OUT under control of controller 510 and direct memory access (DMA) control unit 524.

Signal DATA IN includes "packetized" data, i.e. the data is arranged in packets of multiple bytes of data. Each packet includes a "header" portion that identifies the content of the non-header, or "payload", portion of the packet. For example, the header may indicate that a packet includes video data for programming on channel 5. Other packets include audio data and auxiliary data such as closed caption (CC) data. In FIG. 5, header decoder 522 of processor 520 decodes the header data to determine how the packet payload is processed. For example, header decoder 522 decodes a packet header and determines that a packet includes CC data. Header decoder 522 sends a signal to DMA CTRL unit 524 requesting a CC data store operation. DMA CTRL 524 responds by controlling multiplexer (MUX) 518 and bidirectional input-output (IO) buffer 514 to couple signal DATA IN to the data input of SRAM 540. DMA CTRL 524 also provides the address input to SRAM 540 via MUX 516 for storing the CC data in an area 541 of SRAM 540 as shown in FIG. 5. Other types of data in signal DATA IN, such as video data, are written to other areas of SRAM 540 such as area 542. SRAM control unit (SRAM CTRL) 512 generates read/write strobe signal R/W for SRAM 540 for controlling when data is written into SRAM 540. In addition to storing data received via signal DATA IN, SRAM 540 also stores data generated by controller 510 for providing on-screen display (OSD) features such as menu and channel number displays.

Data stored in SRAM 540 can be accessed and output from processor 520 via MUX 552 and I/O buffer 554 to produce signal DATA OUT. A control signal from DMA CTRL 524 causes application control unit 550 to control MUX 552 such that the output of buffer 514 is coupled to the input of buffer 554. Unit 550 also enables buffer 554 for outputting data. Signal DATA OUT is used to produce an image on a display device such as kinescope 158 in FIG. 1. Processor 520 includes a signal component in signal DATA OUT for each type of data stored in SRAM 540. A first region of the displayed image is produced in response to a video data signal component of signal DATA OUT. Closed captioning is displayed in another region of the image in response to a CC signal component of signal DATA OUT.

Modifying data in a particular area of SRAM 540 affects the corresponding signal component of signal DATA OUT, thereby modifying the associated region of the display. Preventing modification of a particular area of SRAM 540 in response to new input data while continuing to read and display the data in that memory area inhibits updating of the corresponding area of the display. Thus, preventing modification of area 541 of SRAM 540 while displaying captioning freezes closed captioning. Similarly, preventing modification of memory area 542 freezes the video image region of the display.

Preventing modification of regions of SRAM 540 in response to data in signal DATA IN is accomplished in the embodiment shown in FIG. 5 via control signal FREEZE. More specifically, controller 510 responds to a freeze command code provided by a user, e.g., when a freeze button is pressed on remote control 515, by generating signal FREEZE indicating that a particular region of the image is to be frozen. Microinstruction control unit 532, which controls the sequencing of operations in IC 520, responds to signal FREEZE by preventing DMA control unit 524 from initiating a write operation to the corresponding region of SRAM 540 when a packet including the particular type of data is received. Reading data from RAM 540 is unaffected by signal FREEZE allowing un-changed data in SRAM 540 to be accessed repeatedly for producing a frozen image region.

Various modifications of the described embodiments are possible. For example, the invention may be useful in regard to data such as closed caption data that is included in television signals other than NTSC signals or that is located in horizontal line intervals other than line 21 of field 1 of an NTSC signal. In addition, closed caption processor 115 in FIG. 1 is shown included in controller 110 but can be external to controller 110, for example, in a separate integrated circuit or CC decoder unit. Also, various functions shown in FIG. 1 as separate blocks can be included in a single television signal processor IC known as a "one-chip". For example, video signal processor 155, IF processor 130, sync separator 160 and at least a portion of audio processor 135 may be included in an IC such as the LA7612 IC manufactured by Sanyo. Also, selecting an image freeze mode of operation as described in regard to FIG. 4 can be accomplished by adding one or more freeze mode selection keys to remote control 125 in FIG. 1 rather than selecting a freeze mode via a displayed menu. Alternatively, each freeze mode could be selected by simultaneously activating a particular combination of keys of remote 125. Modifications of the arrangement in FIG. 5 are also possible. As an example, signal FREEZE, which is shown as a separate signal in FIG. 5, can be communicated from controller 510 to functions in processor 520 on a serial control bus or by using memory mapped control techniques. Also, signal FREEZE could be directly coupled to DMA CTRL unit 524 or SRAM CTRL unit 512 for inhibiting write operations to SRAM 540 rather than to control unit 532 as shown in FIG. 5. These and other modifications are intended to be within the scope of the following claims.

We claim:

1. Television apparatus receiving an input signal including video information, audio information associated with said video information, and data representing said audio information, said television apparatus comprising:

control means for processing said data included in said input signal for producing a first video signal component representing a visible representation of said audio information associated with said video information; and a signal processor for processing said video information included in said input signal to produce a second video signal component and for combining said first and second video signal components to produce an output video signal including said first and second video signal components; said output video signal being suitable for coupling to a display device to produce a displayed image having a first region displaying said visible representation of said audio information associated with said video information and having a second region displaying said video information included in said input signal;

said visible representation of said audio information being updated in response to said data during a first mode of operation of said television apparatus said control means being responsive to a command code provided by a user for selectively activating a second mode of operation of said television apparatus during which said output video signal includes said first and second video signal components for producing said first and second regions of said image, and during which updating of said visible representation of said audio information associated with said video information in response to said data is prevented; and wherein said control means comprises a decoder for extracting said data from said input signal; and a second signal processor receiving said data extracted from said input signal during said first mode of operation for modifying said first video signal component in response to said data received from said decoder for updating said visible representation of said portion of said audio information;

said control means being responsive to said command code for preventing said second signal processor from modifying said first video signal component during said second mode of operation of said television apparatus.

2. The television apparatus of claim 1 wherein said control means prevents said second signal processor from receiving said data extracted from said input signal during said second mode of operation of said television apparatus.

3. The television apparatus of claim 2 further comprising a memory for storing said data extracted from said input signal by said decoder; said second signal processor producing said first video signal component in response to data stored in said memory; said control means being responsive to said command code for preventing said data extracted from said input signal by said decoder from being stored in said memory during said second mode of operation of said television apparatus.

4. The television apparatus of claim 3 wherein said memory comprises a first memory for storing said data extracted from said input signal by said decoder; and a second memory; said control means transferring data from said first memory to said second memory during said first mode of operation; said second signal processor being responsive to data stored in said second memory for producing said first video signal component; said control means preventing said data extracted from said input signal by said decoder from being stored in said first memory during said second mode of operation of said television apparatus.

5. The television apparatus of claim 1 further comprising a first memory for storing said data extracted from said input signal by said decoder; and a second memory; said control means transferring data from said first memory to said second memory during said first mode of operation; said second signal processor being responsive to data stored in said second memory for producing said first video signal component; said control means preventing said data stored in said first memory from being transferred to said second memory during said second mode of operation of said television apparatus.

6. Television apparatus for processing an input signal including video image information, audio information associated with said video information and data representing a portion of said audio information, said television apparatus comprising:

a memory for storing data;

a signal processor for storing data representative of a portion of said video image information in a first area of said memory, for storing said data representative of said portion of said audio information in a second area of said memory, and for producing an output signal having a first signal component produced in response to said data stored in said first memory area and having a second signal component produced in response to said data stored in said second memory area; said output signal being suitable for coupling to a display device for producing an image having first and second regions produced in response to said first and second signal components, respectively; said data stored in said first and second memory areas being modified in response to said input signal during a first mode of operation of said television apparatus for updating said first and second regions of said image; and a controller responsive to a command code provided by a user for activating a second mode of operation of said television apparatus during which modification of said data stored in said second area of said memory in response to said input signal is prevented, thereby preventing updating of said second region of said image during said second mode of operation; said output signal including said first and second signal components for producing said first and second regions of said image during said second mode of operation, and said data stored in said first memory area being modified in response to said input signal for updating said first region of said image during said second mode of operation.

7. The television apparatus of claim 6 wherein said controller being responsive to a second command code provided by a user for activating a third mode of operation of said television apparatus during which modification of said data stored in said first and second areas of said memory is prevented, thereby preventing updating of said first and second regions of said image during said third mode of operation.

8. Television apparatus comprising:

a display device;

a first signal processor for processing an input signal including video information, audio information associated with said video information, and closed caption data representing a portion of said audio information to provide an output video signal coupled to said display device to produce an image having a first region representing said video information included in said input signal;

a switch responsive to a switch control signal for including a video signal component in said output video signal;

a second signal processor responsive to said closed caption data for producing said video signal component so that said image includes both said first region representing said video information included in said input signal and a second region providing a visible representation of said portion of said audio information when said video signal component is included in said output video signal;

command entry means for generating a command code in response to activation by a user; and a controller responsive to said command code for generating said switch control signal causing said switch to include said video signal component in said output video signal, thereby producing said visible representation of said portion of said audio information in said second region of said display, and for preventing said second signal processor from updating said visible representation in response to said closed caption data; and wherein said second signal processor comprises:

a closed caption decoder for extracting said data included in said input signal and for generating a second control signal indicating when a portion of said data has been extracted;

a memory;

an on-screen display processor for producing said signal component in response to data stored in said memory; and wherein said controller being responsive to said second control signal for storing said portion of said data in said memory;

said controller being responsive to said command code for preventing storing said portion of said data in said memory in response to said second control signal.

* * * * *